United States Patent [19]
Kume et al.

[11] Patent Number: 6,028,405
[45] Date of Patent: Feb. 22, 2000

[54] VARIABLE FREQUENCY DRIVE NOISE ATTENUATION CIRCUIT

[75] Inventors: Tsuneo Kume, Arlington Heights, Ill.; Mahesh M. Swamy, Germantown, Wis.

[73] Assignee: Yaskawa Electric America, Inc., Northbrook, Ill.

[21] Appl. No.: 09/045,333

[22] Filed: Mar. 2, 1998

Related U.S. Application Data

[60] Provisional application No. 60/071,402, Jan. 14, 1998.

[51] Int. Cl.[7] .................................................. H02K 23/00
[52] U.S. Cl. ........................................... 318/254; 318/439
[58] Field of Search .................................. 363/39, 40, 41, 363/58; 318/801–804, 807, 811–814, 439, 244, 254

[56] References Cited

U.S. PATENT DOCUMENTS

| | | | |
|---|---|---|---|
| 4,692,854 | 9/1987 | Baxter, Jr. et al. | 363/75 |
| 5,124,567 | 6/1992 | Fujita et al. | 307/147 |
| 5,784,236 | 7/1998 | Tardiff et al. | 361/56 |
| 5,850,336 | 12/1998 | Nakajima | 363/39 |

FOREIGN PATENT DOCUMENTS 9-84357  9/1995  Japan .

*Primary Examiner*—Robert E. Nappi
*Assistant Examiner*—Rita Leykin
*Attorney, Agent, or Firm*—Wood, Phillips, VanSanten, Clark & Mortimer

[57] ABSTRACT

A noise attenuation circuit is used in a motor drive system. The motor drive system includes a variable frequency drive having a pulse width modulated inverter converting DC power from a DC bus to three-phase power output on three-phase conductors for driving a motor. The noise attenuation circuit comprises a common-mode transformer including a common mode choke having a core, with first, second and third choke windings on the core, each connected in series with one of the three phase conductors, and a fourth winding on the core. A three-phase iron core transformer creates a neutral point representing common mode voltage. The iron core transformer has three primary windings connected in a "wye" configuration to the three phase conductors. The fourth winding has a start connected to the neutral point and an end operatively connected to the DC bus to force a current, dependent on the voltage of the neutral point relative to the DC bus, in the fourth winding of the common mode transformer in an opposite direction to cancel main common mode current.

19 Claims, 3 Drawing Sheets

6,028,405

VARIABLE FREQUENCY DRIVE NOISE ATTENUATION CIRCUIT

This application claims benefit of provisional application No. 60/071,402 filed Jan. 14, 1998.

FIELD OF THE INVENTION

This invention relates to variable frequency drives and, more particularly, to a noise attenuation circuit used with a pulse width modulated inverter.

BACKGROUND OF THE INVENTION

A motor drive system, in one known form, comprises an AC source supplying three-phase AC power to a variable frequency inverter (VFI). The VFI includes an AC/DC converter connected by a DC link to a DC/AC converter. The DC/AC converter may comprise a pulse width modulated inverter using insulated gate bipolar transistors (IGBTs).

In general, the output of the VFI is modulated at a carrier frequency ranging from one kHz to 20 kHz. The higher carrier frequency, particularly in small sized VFIs up to 75 kilowatts, along with the fast rise time of the IGBTs employed results in high dv/dt. This, in turn, yields non-trivial common mode or ground currents. If the distance between the motor and the VFI is long and there exists a mismatch in the cable and motor surge impedance, then there is voltage amplification at the motor terminals. Hence, the dv/dt effects in conjunction with larger cable capacitance enhances the common mode currents.

In practice, the over voltage at the motor terminals, which depends upon the distance between the motor and the VFI as well as the impedance mismatch between the cable and the motor surge impedance, can reach as high as twice the DC bus voltage. In certain cases, due to overlap of the modulating pulses, the peak transient appearing across the motor windings can be as high as three times the DC bus voltage. The high rate of rise of voltage pulses in the range of a few hundreds of nanoseconds give rise to ground currents due to cable capacitance to ground and motor winding capacitance to ground.

The over voltage at the motor terminals due to long lead lengths can cause premature insulation failure in the motor. There exists a non-trivial parasitic capacitance between the stator and the rotor, which is instrumental in creating a charge path between the stator and the rotor. Due to large dv/dt of the common mode voltage, and the above mentioned parasitic capacitance, the rotor develops a voltage similar to a charge pump. When this voltage exceeds the breakdown voltage of the thin lubricant film between the inner and outer rings of the bearing, there is a miniature flashover. This causes pitting in the bearings and is the main reason for premature bearing failure. If not properly mitigated, high frequency ground currents can also create interference with the power system ground and affect other equipment on the power system. This phenomenon contributes to conducted EMI.

The present invention is directed to solving one or more of the problems discussed above in a novel and simple manner.

SUMMARY OF THE INVENTION

In accordance with the invention there is provided a noise attenuation circuit operable to cancel main common mode current.

In accordance with a further aspect of the invention there is disclosed a differentiating circuit in the noise attenuation circuit modifying rising and falling edges of a common mode voltage waveform.

Broadly, there is disclosed herein a noise attenuation circuit used in a motor drive system. The motor drive system includes a variable frequency drive having a pulse width modulated inverter converting DC power from a DC bus to three-phase power output on three-phase conductors for driving a motor. The noise attenuation circuit comprises a common-mode transformer including a common mode choke having a core, with first, second and third choke windings on the core, each connected in series with one of the three phase conductors, and a fourth winding on the core. A three-phase iron core transformer creates a neutral point representing common mode voltage. The iron core transformer has three primary windings connected in a "wye" configuration to the three phase conductors. The fourth winding has a start connected to the neutral point and an end operatively connected to the DC bus to force a current, dependent on the voltage of the neutral point relative to the DC bus, in the fourth winding of the common mode transformer in an opposite direction to cancel common mode current.

It is a feature of the invention that the fourth winding is wound in the same sense as the three choke windings. All four windings are on the same core.

It is a further feature of the invention that the fourth winding end is connected to a mid-point of the DC bus to force a current, dependent on voltage of the neutral point relative to mid-point of the DC bus, in the fourth winding of the common mode transformer in an opposite direction to cancel common mode current. Two capacitors are series connected across the DC bus, and a junction of the two capacitors defines the mid-point of the DC bus.

It is another feature of the invention to provide means for modifying rising and falling edges of a common mode voltage waveform. A differentiating circuit is connected to the fourth winding. The differentiating circuit comprises an RC network. A resistor is connected across the fourth winding and a capacitor is connected between the end of the fourth winding and the DC bus.

It is another feature of the invention to provide a normal mode LC filter connected to the three phase conductors. A line reactor is connected in series with each of the three phase conductors and the windings of the common mode transformer are connected to a load side of the reactors. A wye connected three phase capacitor is connected to a load side of the common mode transformer.

In accordance with another aspect of the invention a motor drive system includes a variable frequency drive having a pulse width modulated inverter using insulated gate bipolar transistors converting DC power from a DC bus to three-phase power at inverter output terminals connected via three feeder conductors to a motor. A noise attenuation circuit is connected between the inverter output terminals and the feeders. The noise attenuation circuit comprises a common mode transformer including a common mode choke having a core, with first, second and third choke windings on the core, each connected in series with one of the three feeder conductors, and a fourth winding on the core. A three-phase iron core transformer creates a neutral point representing common mode voltage. The iron core transformer has three primary windings connected in a wye configuration to the three feeder conductors. The fourth winding of the common mode transformer has a start connected to the neutral point and an end operatively connected to the DC bus to force a current, dependent on the voltage of the neutral point relative to the DC bus, in an opposite direction to cancel the common mode current.

Further features and advantages of the invention will be readily apparent from the specification and from the drawings.

DETAILED DESCRIPTION OF THE INVENTION

Figure 1:
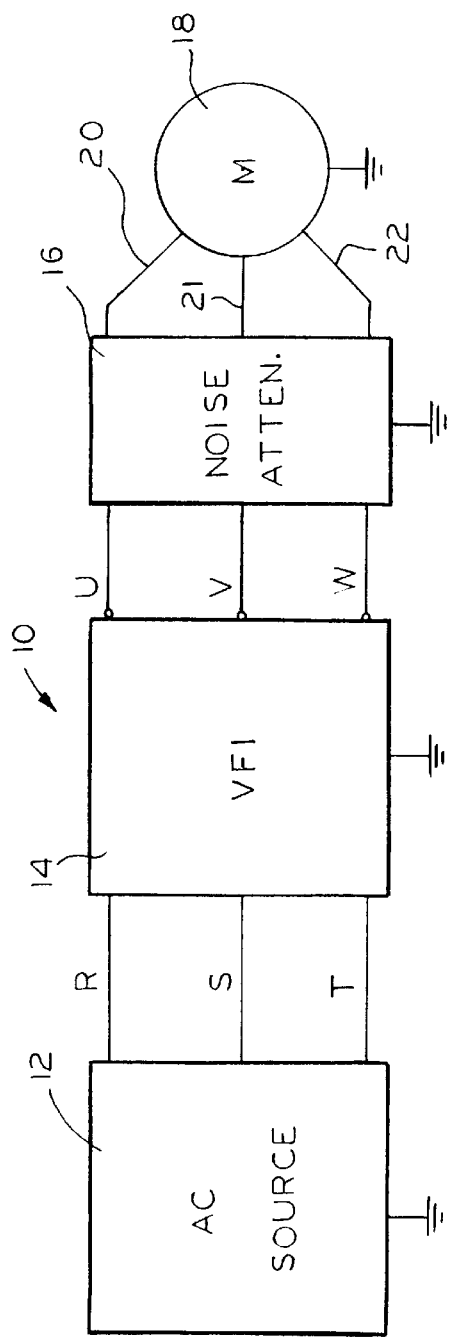
FIG. 1 is a generalized block diagram of a motor drive system including a noise attenuation circuit according to the invention.

Referring initially to FIG. 1, a motor drive system 10 is illustrated. The motor drive system includes an AC source 12, a variable frequency inverter (VFI) 14 and a noise attenuation circuit 16 for driving an induction motor 18. The AC source 12 may comprise a drive or the like developing three-phase AC power on feeder conductors labeled R, S and T. The AC source 12 is grounded. The VFI 14, as described more particularly below, converts the AC power from the feeder conductors R, S and T, to DC power and converts it back to AC power at a select frequency which is then impressed across terminals U, V and W. The three-phase power from the VFI 14 is passed through the noise attenuation circuit 16 according to the invention. The noise attenuation circuit 16 is connected to three feeder conductors 20, 21 and 22 to drive the motor 18.

Figure 2:
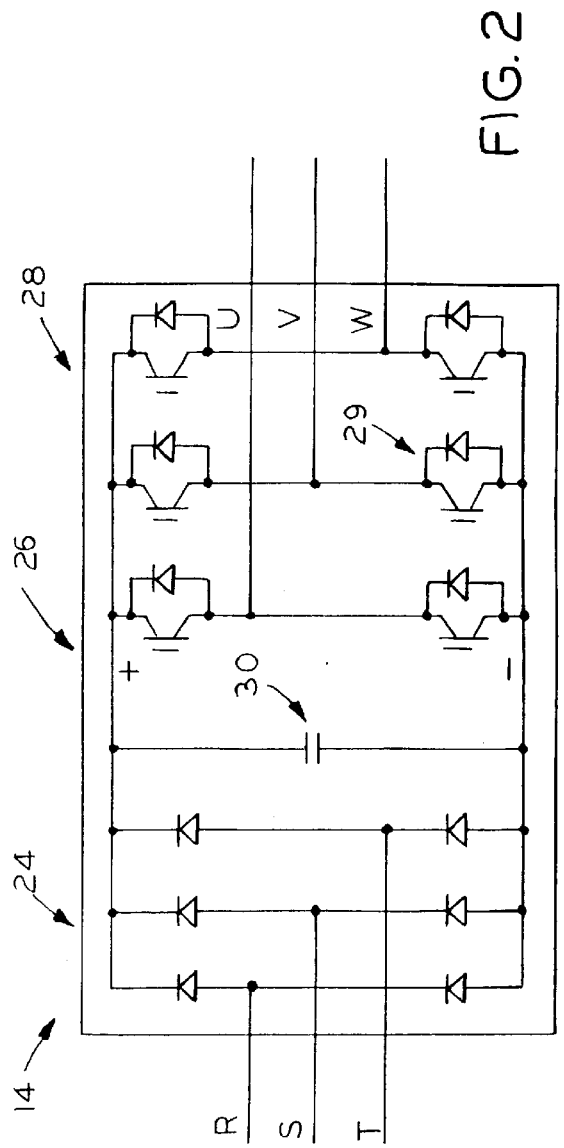
FIG. 2 is a schematic diagram of a variable frequency drive of FIG. 1.

Referring to FIG. 2, a schematic diagram illustrates a typical circuit implementation for the VFI 14. The VFI 14 includes an AC/DC converter 24 connected by a DC bus 26 to a DC/AC converter 28. Particularly, according to the illustrated embodiment of the invention, the AC/DC converter 24 comprises a full wave bridge rectifier circuit of conventional construction which is operable to convert three-phase AC power to DC power. The DC bus 26 includes a conventional filter 30. The DC bus 26 has rails labeled "+" and "−". The DC/AC converter 28 comprises an inverter section. Particularly, the inverter section 28 comprises a pulse width modulation (PWM) inverter using insulated gate bipolar transistors (IGBTs) 29. The six IGBTs 29 are connected in a three phase bridge configuration to the DC bus 26 to develop power at the terminals U, V and W. The IGBTs 29 are pulse width modulated using a conventional control at a carrier frequency ranging from one kHz to twenty kHz. Particularly, the PWM inverter is controlled to create a sinusoidal effect for the induction motor 18. The pulse frequency used is fixed. The pulse width is varied to vary sinusoidal frequency. The IGBTs are high speed switches that can produce dv/dt as high as 3,000 V/micro-sec.

The AC source 12 typically supplies 460 volts AC. This is converted to approximately 650–700 volts DC on the DC bus 26.

As described above, the high carrier frequency, along with fast rise time of the IGBTs, results in high dv/dt which yields non-trivial common mode or ground currents. In accordance with the invention, the noise attenuation circuits herein are operable to cancel common mode currents and to modify rising and falling edges of a common mode voltage waveform to reduce dv/dt in order to lower ground currents.

Figure 3:
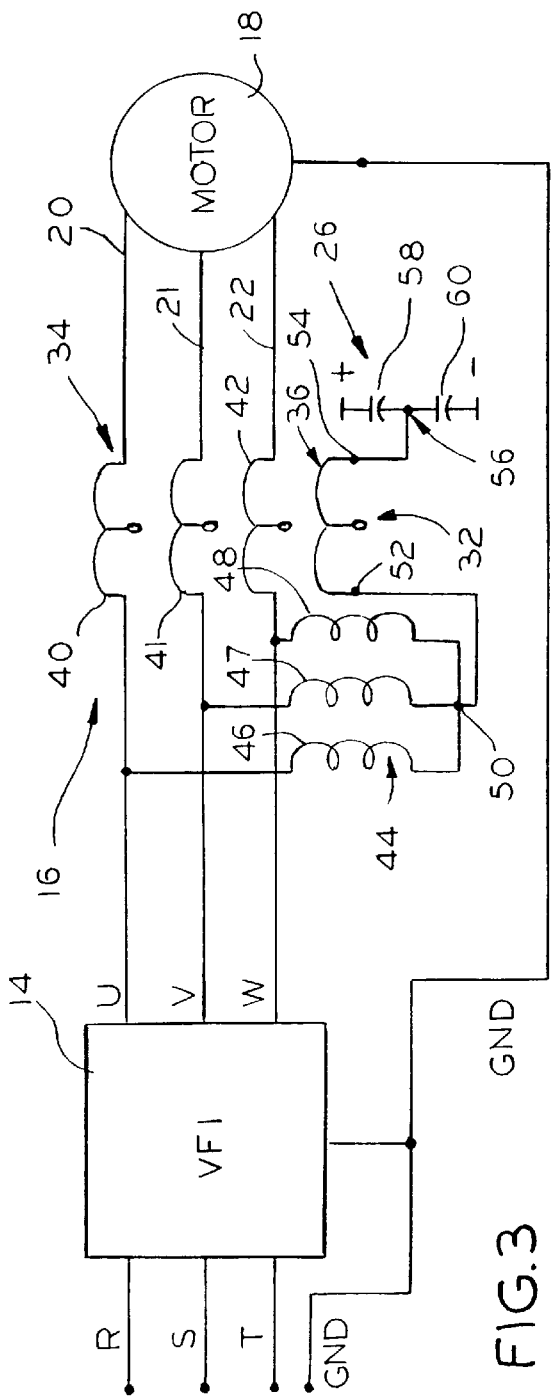
FIG. 3 is a partial block diagram, similar to FIG. 1, showing a circuit implementation of the noise attenuation circuit according to the invention.

Referring to FIG. 3, a noise attenuation circuit 16 according to a first embodiment of the invention is illustrated. The noise attenuation circuit 16 comprises a passive circuit for cancelling common mode currents. The passive circuit overcomes drawbacks of prior active schemes which are limited in their applicability to lower voltage systems. The passive circuit also has higher reliability compared to active filtering schemes.

Figure 7:
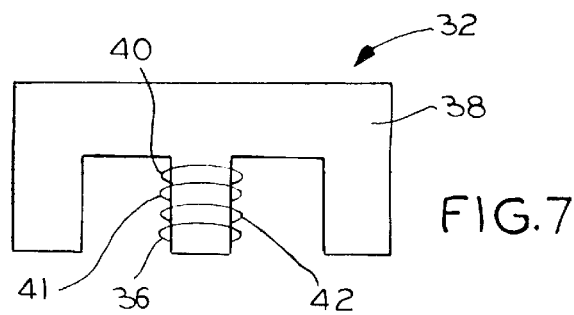
FIG. 7 is a plan view of a common mode transformer used with the noise attenuation circuit.

The attenuation circuit 16 includes a common mode transformer 32. Particularly, the common mode transformer 32 comprises a common mode choke 34 with an additional winding 36. Referring also to FIG. 7, the common mode transformer 32 includes a core 38 with first, second and third choke windings 40, 41 and 42. The windings 40, 41 and 42 are connected in series with the respective feeder conductors 20, 21 and 22, as shown in FIG. 3. The additional, or fourth, winding 36 is wound in the same sense as the three choke windings 40–42.

A three-phase iron core transformer 44 creates a neutral point to obtain the common mode voltage. Three primary windings 46, 47 and 48 are connected in a wye configuration including a junction 50 to define the neutral point. The neutral point 50 is connected to a start 52 of the common mode transformer fourth winding 36. An end 54 of the fourth winding 36 is connected to a mid-point 56 of the DC bus 26. The mid-point 56 is formed at a junction between two capacitors 58 and 60 series connected across the DC bus 26.

The windings 46–48 of the iron core transformer 44 offer high impedance across the phase-to-phase voltage, resulting in trivial normal mode currents. Since they are in a three-phase core structure, the windings 46–48 offer very low impedance to the common mode current, thereby facilitating large enough common mode currents to flow through the fourth winding 36.

The voltage at the neutral point 50 with respect to the mid-point of the DC bus 56 is exactly in phase with the common mode current producing voltage existing in the motor drive system 10. By forcing a current, which is dependent on the voltage of the neutral point 50 relative to the mid-point of the DC bus 56, in the fourth winding 36 of the common mode transformer 32 in an opposite direction cancels the common mode current. The common mode transformer core 38 is required to handle only high frequency components. Therefore, it may be of smaller size. However, for two-phase modulation the size of the core would have to be increased.

The noise attenuating circuit 16 is instrumental in attenuating the magnitudes of ground current due to the PWM nature of the output of the VFI 14. The noise attenuating circuit 16 has two main components. They are the three-phase iron core transformer 44 for creating the neutral point and the common mode transformer 32 with its fourth winding 36 across the neutral of the three-phase transformer 44 and the mid-point of the DC bus 56.

The three-phase iron core transformer 44 is unique in the sense that it does not have any secondary winding. Consequently, the size of the transformer can be very small. The current flowing through the windings 46–48 is directly related to the neutral current flowing out of the neutral point 50 and into the fourth winding 36 of the common mode transformer 32. The common mode current, denoted by $I_{cm}$ will consist of a third harmonic quantity along with current pulses during a change in the inverter switching state. The third harmonic quantity is pronounced under low output frequency conditions. The rms current through the fourth winding 36 can reach as high as 0.3 p.u. of the rated output current. This current is made up of three equal components provided by the three phases of the iron core transformer 44. The current rating of the transformer 44 is $$0.3 * I_{pu}/3 = 0.1 * I_{pu}.$$

Each of the windings 46–48 has to withstand the maximum line to neutral voltage of the output of the VFI 14. The nominal fundamental quantity of the output can be as high as 575V for the Canadian market and 460V for the American market. For the American market, the nominal fundamental voltage will be 266V. The voltage waveform will contain high frequency voltage pulses which are the same as the inverter output PWM pattern. Once the winding current is known and the voltage across each phase winding 46–48 is known, an iron core transformer can easily be designed with no secondary winding. Because of the potentially high carrier frequency in the output voltage waveform, the flux density of the iron core transformer 44 should be designed to be well within 1.0 T.

With respect to the common mode transformer 32, the voltage across the fourth winding 36 can reach an RMS value equal to one-half the DC bus voltage. Hence, the RMS voltage rating of the coil 36 should be $0.5 * E_d$, where $E_d$ is the DC bus voltage. As discussed above, the current through the fourth winding 36 can be a high as $0.3 * I_{pu}$. The lowest operable carrier frequency results in the biggest inductor design. The lowest carrier frequency of operation is assumed to be 3 kHz. Based on these constraints, the inductance of the fourth winding of the common mode coil is:

$$L = \frac{0.5 * E_d}{0.3 * I_{pu} * 2 * \pi * 3000}.$$

For the above example, the value of $E_d$ is 680V, and the value of $I_{pu}$ is 11.0 Amps. Hence, the computed value of L is 5.5 mH.

Figure 4:
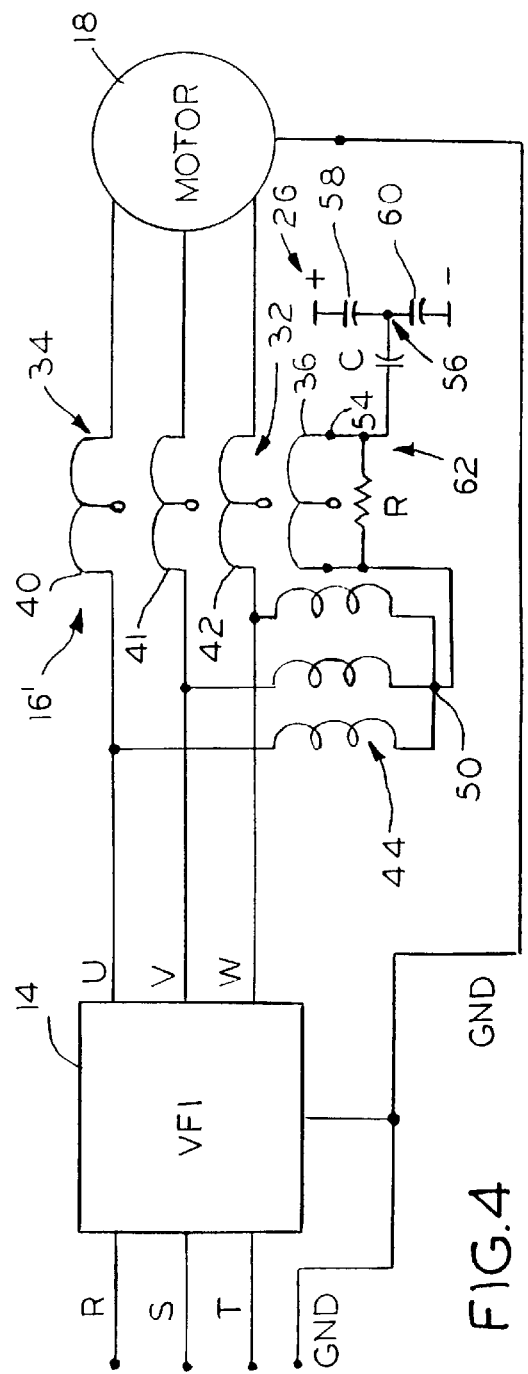
FIG. 4 is a partial block diagram, similar to FIG. 1, showing a circuit implementation of the noise attenuation circuit according to an alternative embodiment.

With the noise attenuation circuit 16 of FIG. 3, the common mode current at the motor end is cancelled effectively. The shaft voltage is also reduced significantly. However, an important aspect to be considered is the size of the common mode transformer 32. A further improved circuit is illustrated in FIG. 4 with a noise attenuation circuit 16' according to an alternative embodiment of the invention. Where elements are similar to those in the noise attenuating circuit 16 of FIG. 3, like reference numerals are used for simplicity.

The main reason for the large common mode current in the output of an inverter is due to the steep rising and falling edges of the voltage pulses. If the rate of rise of the voltage pulse is reduced, then it is possible to reduce the common mode current and its associated negative effect on the grounding system. The further intent of the noise attenuation circuit 16' of FIG. 4 is to modify the rising and falling edges of the common mode voltage, i.e., neutral to ground voltage, waveform. Therefore, the size of the common mode transformer 32 can be drastically reduced. A differentiating circuit 62 is added in series with the fourth winding 36 of the common mode transformer 32, enabling reduction in size of the common mode transformer 32.

Particularly, the neutral voltage at the neutral point 50 is differentiated with the circuit 62 which comprises an RC network having a resistor R across the fourth winding 36 and a capacitor C connected between the end of the fourth winding 54 and the mid-point of the DC bus 56. The voltage across the resistor R is impressed across the fourth winding 36. This voltage, when subtracted from the common mode voltage existing across the primary coils 40–42, results in a modified rising and falling edge having lower dv/dt. The value of R and C is selected such that the common mode voltage pulses are critically damped.

Figure 5:
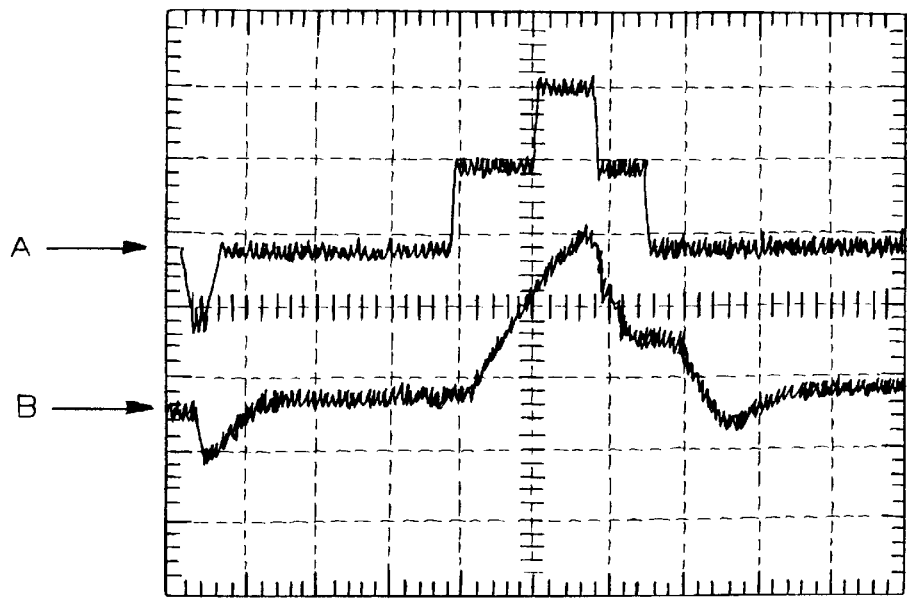
FIG. 5 is a series of waveforms illustrating operation of the noise attenuation circuit of FIG. 4.

FIG. 5 illustrates a first trace, labeled A, in which the reference neutral to ground voltage dv/dt is equal to 250V/μsec. This is without the modification of FIG. 4. The second trace, labeled B, shows the neutral to ground voltage with the differentiating circuit 62. In this case, dv/dt equals 25V/μsec. These traces are taken at $F_{sw}$=5 kHz.

The selection criteria for the resistor R and capacitor C depend on the rise time of the common mode voltage pulses. Typical rise times vary from 100 nanoseconds to 400 nanoseconds. The product of R and C yields the time constant τ. For the purposes of modifying the rise time of the input pulses, the time constant τ of the RC network should be at least five times the rise time. Taking the worst case, where the rise time of the common mode voltage pulse is 100 nanoseconds, the RC time constant should be close to 500 nanoseconds. The value of R can be selected to critically damp the oscillation set up due to the resonance between L and C. Hence, R should be $\geq 2 * \sqrt{(L/C)}$. The value of L is about 20 μH and the value of C is selected to be about 2 nF. Hence, the value of R should be greater than 200 Ohms.

Figure 6:
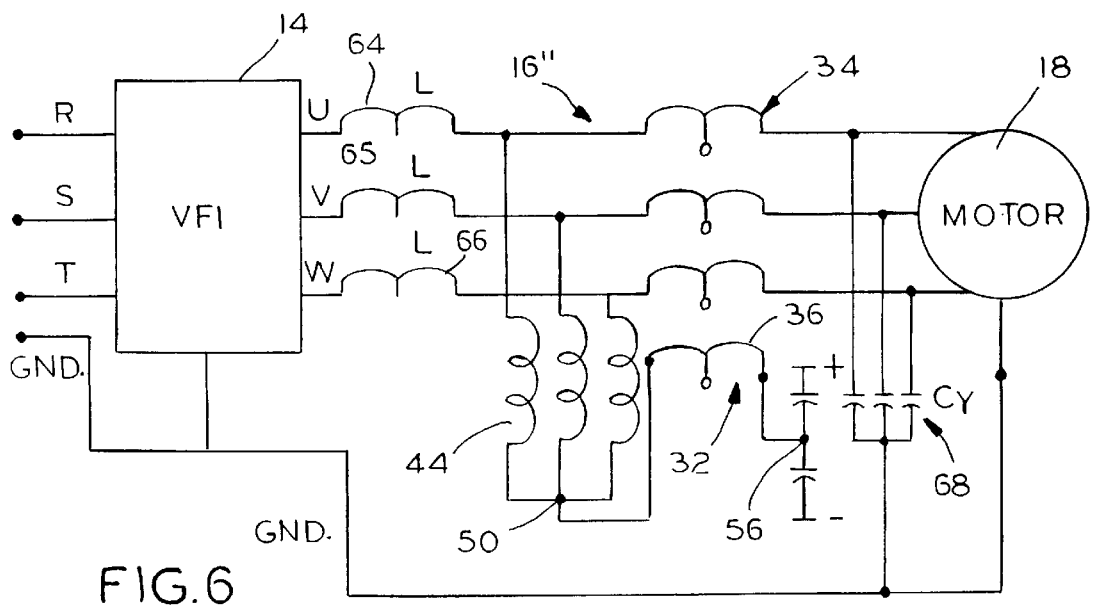
FIG. 6 is a partial block diagram, similar to FIG. 3, further illustrating the addition of an LC filter.

Referring to FIG. 6, a further alternative embodiment of a noise attenuating circuit 16" is illustrated. Again, elements similar to those in the noise attenuating circuit 16 of FIG. 3 are illustrated with like reference numerals. In order to attenuate the common mode current as well as maintain sinusoidal wave form at the motor terminals, a normal mode LC filter is added. Three single phase line reactors 64, 65 and 66 are connected to the respective VFI terminals U, V and W. The choke windings of the common mode transformer 32 are connected to the load side of the reactors 64–66. The reactors 64–66 constitute the L part of the LC filter. A wye connected capacitor 68, comprising C of the LC network, is connected to the output of the common mode transformer 32.

The voltage at the neutral point 50 with respect to the mid-point of the DC bus 56 is exactly in phase with the common mode current producing voltage existing in the motor drive system 10. By forcing a current which is dependent on the neutral to mid-point of DC bus voltage in the fourth winding 36 of the common mode transformer 32 in an opposite direction cancels the main common mode current. The L and C of the output filter are instrumental in filtering out the high frequency normal mode currents. The amplification of the common mode currents due to the filter capacitor is also taken care of by the common mode transformer 32, since the filter capacitor 68 is downstream and its capacitance can be likened to that of a cable having unusually large capacitive currents.

In accordance with the proposed invention, the noise attenuation circuits do not utilize active parts and, hence, are not restricted to low voltage applications and thus can be applied to 460V as well as 575V systems. No transistors are used, so that the reliability of the circuit is higher than with active circuits. The output voltage as seen by the motor 18 is almost sinusoidal, which alleviates the problem of voltage reflection phenomenon. Common mode currents are attenuated significantly on both the motor end and the inverter end. Use of three single-phase line reactors, instead of one three-phase reactor, offers additional attenuation of common mode currents.

We claim:

1. In a motor drive system including a variable frequency drive having a pulse width modulated inverter converting DC power from a DC bus to three phase power output on three phase conductors for driving a motor, a noise attenuation circuit comprising:

a common mode transformer including a common mode choke having a core, with first, second and third choke windings on the core, each connected in series with one of the three phase conductors, and a fourth winding on the core;

a three phase iron core transformer to create a neutral point representing common mode voltage, the iron core transformer having three primary windings connected in a wye configuration to the three phase conductors;

the fourth winding having a start connected to the neutral point and an end operatively connected to the DC bus to force a current, dependent on voltage of the neutral point relative to the DC bus, in the fourth winding of the common mode transformer in an opposite direction to cancel common mode current.

2. The noise attenuation circuit of claim 1 wherein the fourth winding is wound in the same sense as the three choke windings.

3. The noise attenuation circuit of claim 1 wherein the fourth winding end is connected to a midpoint of the DC bus to force a current, dependent on voltage of the neutral point relative to mid-point of the DC bus, in the fourth winding of the common mode transformer in an opposite direction to cancel common mode current.

4. The noise attenuation circuit of claim 3 wherein two capacitors are series connected across the DC bus, and a junction of the two capacitors defines the mid-point of the DC bus.

5. The noise attenuation circuit of claim 1 further comprising a differentiating circuit connected to the fourth winding.

6. The noise attenuation circuit of claim 5 wherein the differentiating circuit comprises an RC network.

7. The noise attenuation circuit of claim 6 wherein the differentiating circuit comprises a resistor connected across the fourth winding and a capacitor connected between the end of the fourth winding and the DC bus.

8. The noise attenuation circuit of claim 1 further comprising a normal mode LC filter connected to the three phase conductors.

9. The noise attenuation circuit of claim 8 wherein a line reactor is connected in series with each of the three phase conductors and the windings of the common mode transformer, and a wye connected three phase capacitor is connected to a load side of the common mode transformer.

10. The noise attenuation circuit of claim 1 further comprising means for modifying rising and falling edges of a common mode voltage waveform.

11. In a motor drive system including a variable frequency drive having a pulse width modulated inverter using insulated gate bipolar transistors converting DC power from a DC bus to three phase power at inverter output terminals connected via three feeder conductors to a motor, a noise attenuation circuit connected between the inverter output terminals and the feeders comprising:

a common mode transformer including a common mode choke having a core, with first, second and third choke windings on the core, each connected in series with one of the three feeder conductors, and a fourth winding on the core, wherein the fourth winding is wound in the same sense as the three choke windings;

a three phase iron core transformer to create a neutral point representing common mode voltage, the iron core transformer having three primary windings connected in a wye configuration to the three feeder conductors;

the fourth winding having a start connected to the neutral point and an end operatively connected to the DC bus to force a current, dependent on voltage of the neutral point relative to the DC bus, in the fourth winding of the common mode transformer in an opposite direction to cancel common mode current.

12. In a motor drive system including a variable frequency drive having a pulse width modulated inverter using insulated gate bipolar transistors converting DC power from a DC bus to three phase power at inverter output terminals connected via three feeder conductors to a motor, a noise attenuation circuit connected between the inverter output terminals and the feeders comprising:

a common mode transformer including a common mode choke having a core, with first, second and third choke windings on the core, each connected in series with one of the three feeder conductors, and a fourth winding on the core;

a three phase iron core transformer to create a neutral point representing common mode voltage, the iron core transformer having three primary windings connected in a wye configuration to the three feeder conductors;

the fourth winding having a start connected to the neutral point and an end operatively connected to the DC bus to force a current, dependent on voltage of the neutral point relative to the DC bus, in the fourth winding of the common mode transformer in an opposite direction to cancel common mode current, and wherein the fourth winding end is connected to a midpoint of the DC bus to force a current, dependent on voltage of the neutral point relative to mid-point of the DC bus, in the fourth winding of the common mode transformer in an opposite direction to cancel common mode current.

13. The noise attenuation circuit of claim 12 wherein two capacitors are series connected across the DC bus, and a junction of the two capacitors defines the mid-point of the DC bus.

14. In a motor drive system including a variable frequency drive having a pulse width modulated inverter using insulated gate bipolar transistors converting DC power from a DC bus to three phase power at inverter output terminals connected via three feeder conductors to a motor, a noise attenuation circuit connected between the inverter output terminals and the feeders comprising:

a common mode transformer including a common mode choke having a core, with first, second and third choke windings on the core, each connected in series with one of the three feeder conductors, and a fourth winding on the core;

a three phase iron core transformer to create a neutral point representing common mode voltage, the iron core transformer having three primary windings connected in a wye configuration to the three feeder conductors;

the fourth winding having a start connected to the neutral point and an end operatively connected to the DC bus to force a current, dependent on voltage of the neutral point relative to the DC bus, in the fourth winding of the common mode transformer in an opposite direction to cancel common mode current, and a differentiating circuit connected to the fourth winding.

15. The noise attenuation circuit of claim 14 wherein the differentiating circuit comprises an RC network.

16. The noise attenuation circuit of claim 15 wherein the differentiating circuit comprises a resistor connected across the fourth winding and a capacitor connected between the end of the fourth winding and the DC bus.

17. In a motor drive system including a variable frequency drive having a pulse width modulated inverter using insulated gate bipolar transistors converting DC power from a DC bus to three phase power at inverter output terminals connected via three feeder conductors to a motor, a noise attenuation circuit connected between the inverter output terminals and the feeders comprising:

a common mode transformer including a common mode choke having a core, with first, second and third choke windings on the core, each connected in series with one of the three feeder conductors, and a fourth winding on the core;

a three phase iron core transformer to create a neutral point representing common mode voltage, the iron core transformer having three primary windings connected in a wye configuration to the three feeder conductors;

the fourth winding having a start connected to the neutral point and an end operatively connected to the DC bus to force a current, dependent on voltage of the neutral point relative to the DC bus, in the fourth winding of the common mode transformer in an opposite direction to cancel common mode current, and a normal mode LC filter connected to the three feeder conductors.

18. The noise attenuation circuit of claim 17 wherein a line reactor is connected in series with each of the three phase conductors and the windings of the common mode transformer, and a wye connected three phase capacitor is connected to a load side of the common mode transformer.

19. In a motor drive system including a variable frequency drive having a pulse width modulated inverter using insulated gate bipolar transistors converting DC power from a DC bus to three phase power at inverter output terminals connected via three feeder conductors to a motor, a noise attenuation circuit connected between the inverter output terminals and the feeders comprising:

a common mode transformer including a common mode choke having a core, with first, second and third choke windings on the core, each connected in series with one of the three feeder conductors, and a fourth winding on the core;

a three phase iron core transformer to create a neutral point representing common mode voltage, the iron core transformer having three primary windings connected in a wye configuration to the three feeder conductors;

the fourth winding having a start connected to the neutral point and an end operatively connected to the DC bus to force a current, dependent on voltage of the neutral point relative to the DC bus, in the fourth winding of the common mode transformer in an opposite direction to cancel common mode current, and means for modifying rising and falling edges of a common mode voltage waveform.

* * * * *